(12) United States Patent
Li (10) Patent No.: US 8,264,137 B2
(45) Date of Patent: Sep. 11, 2012

(54) CURING BINDER MATERIAL FOR CARBON NANOTUBE ELECTRON EMISSION CATHODES

(75) Inventor: Yunjun Li, Austin, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 799 days.

(21) Appl. No.: 11/612,313

(22) Filed: Dec. 18, 2006

(65) Prior Publication Data

US 2007/0262687 A1    Nov. 15, 2007

Related U.S. Application Data (60) Provisional application No. 60/755,978, filed on Jan. 3, 2006.

(51) Int. Cl.
*H01J 1/62* (2006.01)
(52) U.S. Cl. ............. 313/495; 428/403; 445/50; 427/78
(58) Field of Classification Search .................. 313/311, 313/495–497; 430/270.1; 524/495; 428/403
See application file for complete search history.

(56) References Cited

U.S. PATENT DOCUMENTS

| | | | |
|---|---|---|---|
| 5,458,784 A | 10/1995 | Baker et al. | |
| 5,512,368 A | 4/1996 | Harmer et al. | |
| 5,547,748 A | 8/1996 | Ruoff et al. | |
| 5,691,101 A | 11/1997 | Ushirogouchi et al. | |
| 5,800,706 A | 9/1998 | Fischer | |
| 5,866,434 A | 2/1999 | Massey et al. | |
| 5,965,202 A | 10/1999 | Taylor-Smith et al. | |
| 6,017,390 A | 1/2000 | Charych et al. | |
| 6,090,545 A | 7/2000 | Wohlstadter et al. | |
| 6,126,888 A | 10/2000 | Goldstein | |
| 6,184,280 B1 | 2/2001 | Shibuta | |
| 6,203,814 B1 | 3/2001 | Fishe et al. | |
| 6,287,765 B1 | 9/2001 | Cubicciotti | |
| 6,291,116 B1 | 9/2001 | Wolk et al. | |
| 6,291,126 B2 | 9/2001 | Wolk et al. | |
| 6,299,812 B1 | 10/2001 | Newman et al. | |
| 6,309,449 B1 | 10/2001 | Klos et al. | |

(Continued)

FOREIGN PATENT DOCUMENTS

JP    2004288609 A   * 10/2004

OTHER PUBLICATIONS

Brown, John F., et al.; Double Chain Polymers of Phenylsilsesquioxane; *J. Am. Chem. Soc. / Communications to the Editor* vol. 82; Dec. 5, 1960; pp. 6194-6195.

(Continued)

*Primary Examiner* — Nimeshkumar Patel
*Assistant Examiner* — Mary Ellen Bowman
(74) *Attorney, Agent, or Firm* — Sughrue Mion, PLLC (57) ABSTRACT

A binder material, inorganic polymer, is used to formulate carbon nanotube pastes. This material can be cured at 200° C. and has a thermal-stability up to 500° C. Low-out gassing of this binder material makes it a good candidate for long life field emission devices. Due to better adhesion with this binder material, a strong adhesive peelable polymer from liquid form can be applied on the CNT cathode to achieve a uniform activation with even contact and pressure on the surface. The peelable polymer films may be used both as an activation layer and a mask layer to fabricate high-resolution patterned carbon nanotube cathodes for field emission devices using lithographic processes.

14 Claims, 8 Drawing Sheets

U.S. PATENT DOCUMENTS

| | | |
|---|---|---|
| 6,318,649 B1 | 11/2001 | Mazurkiewicz |
| 6,384,727 B1 | 5/2002 | Diprizio et al. |
| 6,401,526 B1 | 6/2002 | Dai et al. |
| 6,410,201 B2 | 6/2002 | Wolk et al. |
| 6,423,768 B1 | 7/2002 | Khouri |
| 6,432,176 B1 | 8/2002 | Klos et al. |
| 6,444,864 B1 | 9/2002 | Knight et al. |
| 6,475,670 B1 | 11/2002 | Ito |
| 6,491,789 B2 | 12/2002 | Niu |
| 6,517,995 B1 | 2/2003 | Jacobson et al. |
| 6,521,703 B2 | 2/2003 | Zarnoch et al. |
| 6,538,725 B2 | 3/2003 | Potyrailo et al. |
| 6,555,945 B1 | 4/2003 | Baughman et al. |
| 6,566,451 B2 | 5/2003 | Wang et al. |
| 6,566,665 B2 | 5/2003 | Baglin et al. |
| 6,582,876 B2 | 6/2003 | Wolk et al. |
| 6,599,446 B1 | 7/2003 | Todt et al. |
| 6,610,351 B2 | 8/2003 | Shchegolikhin et al. |
| RE38,256 E | 9/2003 | Ushirogouchi et al. |
| 6,617,398 B2 | 9/2003 | Yeager et al. |
| 6,643,165 B2 | 11/2003 | Segal et al. |
| 6,650,531 B2 | 11/2003 | Ikeda et al. |
| 6,667,099 B1 | 12/2003 | Greiner et al. |
| 6,682,677 B2 | 1/2004 | Lobovsky et al. |
| 6,683,783 B1 | 1/2004 | Smalley et al. |
| 6,689,835 B2 | 2/2004 | Amarasekera et al. |
| 6,696,565 B2 | 2/2004 | Fenniri |
| 6,703,615 B2 | 3/2004 | Nakayama et al. |
| 6,705,152 B2 | 3/2004 | Routkevitch et al. |
| 6,706,963 B2 | 3/2004 | Gaudiana et al. |
| 6,712,864 B2 | 3/2004 | Horiuchi et al. |
| 6,713,173 B2 | 3/2004 | Mayes et al. |
| 6,723,396 B1 | 4/2004 | Patrick |
| 6,730,905 B2 | 5/2004 | Nakagawa et al. |
| 6,740,900 B2 | 5/2004 | Hirai |
| 6,749,982 B2 | 6/2004 | Rao et al. |
| 6,762,237 B2 | 7/2004 | Glatkowski et al. |
| 6,770,583 B2 | 8/2004 | Keller |
| 6,781,166 B2 | 8/2004 | Lieber et al. |
| 6,782,154 B2 | 8/2004 | Zhao et al. |
| 6,783,746 B1 | 8/2004 | Zhang et al. |
| 6,784,028 B2 | 8/2004 | Rueckes et al. |
| 6,794,220 B2 | 9/2004 | Hirai et al. |
| 6,805,985 B2 | 10/2004 | Yamada et al. |
| 6,806,473 B2 | 10/2004 | Honda et al. |
| 6,811,724 B2 | 11/2004 | Majumdar et al. |
| 6,815,075 B2 | 11/2004 | Kasai et al. |
| 6,822,032 B2 | 11/2004 | Gallucci |
| 6,824,086 B1 | 11/2004 | Mazurkiewicz et al. |
| 6,828,015 B2 | 12/2004 | Hirata et al. |
| 6,833,201 B2 | 12/2004 | Czerw et al. |
| 6,835,516 B2 | 12/2004 | Castle et al. |
| 6,835,591 B2 | 12/2004 | Rueckes et al. |
| 6,836,424 B2 | 12/2004 | Segal et al. |
| 6,841,213 B2 | 1/2005 | Parsonage et al. |
| 6,852,410 B2 | 2/2005 | Veedu et al. |
| 6,855,744 B2 | 2/2005 | Klett et al. |
| 6,855,787 B2 | 2/2005 | Funaki et al. |
| 6,858,270 B2 | 2/2005 | Patrick |
| 6,858,299 B2 | 2/2005 | Lundquist et al. |
| 6,860,956 B2 | 3/2005 | Bao et al. |
| 6,861,481 B2 | 3/2005 | Ding et al. |
| 6,867,295 B2 | 3/2005 | Woodruff et al. |
| 6,872,330 B2 | 3/2005 | Mack et al. |
| 6,876,574 B2 | 4/2005 | Giebeler et al. |
| 6,878,871 B2 | 4/2005 | Scher et al. |
| 6,878,961 B2 | 4/2005 | Lyons et al. |
| 6,879,143 B2 | 4/2005 | Nagahara et al. |
| 6,881,492 B2 | 4/2005 | Rao et al. |
| 6,887,450 B2 | 5/2005 | Chen et al. |
| 6,890,984 B2 | 5/2005 | Aramaki et al. |
| 6,893,103 B2 | 5/2005 | Okada et al. |
| 6,893,895 B1 | 5/2005 | Okoroanyanwu et al. |
| 6,894,100 B2 | 5/2005 | Miyoshi et al. |
| 6,897,960 B2 | 5/2005 | DiMeo, Jr. et al. |
| 6,900,264 B2 | 5/2005 | Kumar et al. |
| 6,905,511 B2 | 6/2005 | Wang et al. |
| 6,908,261 B2 | 6/2005 | Hannay et al. |
| 6,911,682 B2 | 6/2005 | Rueckes et al. |
| 6,913,713 B2 | 7/2005 | Chittibabu et al. |
| 6,919,063 B2 | 7/2005 | Jang et al. |
| 6,919,119 B2 | 7/2005 | Kalkan et al. |
| 6,919,173 B2 | 7/2005 | Tsionsky et al. |
| 6,919,395 B2 | 7/2005 | Rajagopalan et al. |
| 6,919,592 B2 | 7/2005 | Segal et al. |
| 6,921,575 B2 | 7/2005 | Horiuchi et al. |
| 6,927,249 B1 | 8/2005 | Lee et al. |
| 6,942,921 B2 | 9/2005 | Rueckes et al. |
| 6,946,084 B2 | 9/2005 | Nakagawa et al. |
| 6,946,382 B2 | 9/2005 | Townsend, III et al. |
| 6,946,597 B2 | 9/2005 | Sager et al. |
| 6,949,237 B2 | 9/2005 | Smalley et al. |
| 6,953,001 B2 | 10/2005 | Fanucci et al. |
| 6,958,192 B2 | 10/2005 | Hergenrother et al. |
| 6,977,171 B1 | 12/2005 | Dennis et al. |
| 6,979,248 B2 | 12/2005 | Hu et al. |
| 6,979,709 B2 | 12/2005 | Smalley et al. |
| 6,982,174 B2 | 1/2006 | Bonnell et al. |
| 6,986,853 B2 | 1/2006 | Glatkowski et al. |
| 6,988,925 B2 | 1/2006 | Arthur et al. |
| 6,989,123 B2 | 1/2006 | Lee et al. |
| 6,991,280 B2 | 1/2006 | McKnight et al. |
| 6,991,528 B2 | 1/2006 | Hu et al. |
| 6,991,750 B2 | 1/2006 | Majumdar et al. |
| 6,991,876 B2 | 1/2006 | Narang et al. |
| 6,994,907 B2 | 2/2006 | Resasco et al. |
| 6,995,266 B2 | 2/2006 | Shankarling et al. |
| 6,998,452 B1 | 2/2006 | Parker |
| 7,001,556 B1 | 2/2006 | Shambaugh |
| 7,011,905 B2 | 3/2006 | Sakamoto et al. |
| 7,013,998 B2 | 3/2006 | Ray et al. |
| 7,014,737 B2 | 3/2006 | Harutyunyan et al. |
| 7,015,046 B2 | 3/2006 | Wohlstadter et al. |
| 7,018,872 B2 | 3/2006 | Hirai et al. |
| 7,018,920 B2 | 3/2006 | Meagley et al. |
| 7,019,079 B2 | 3/2006 | Sumi et al. |
| 7,019,391 B2 | 3/2006 | Tran et al. |
| 7,020,372 B2 | 3/2006 | Lee et al. |
| 7,026,432 B2 | 4/2006 | Charat et al. |
| 7,029,056 B2 | 4/2006 | Browne et al. |
| 7,029,646 B2 | 4/2006 | Margrave et al. |
| 7,033,525 B2 | 4/2006 | Blanchet-Fincher et al. |
| 7,034,854 B2 | 4/2006 | Cruchon-Dupeyrat et al. |
| 7,037,562 B2 | 5/2006 | Jimenez et al. |
| 7,038,006 B2 | 5/2006 | Ogawa et al. |
| 7,048,903 B2 | 5/2006 | Colbert et al. |
| 7,048,999 B2 | 5/2006 | Smalley et al. |
| 7,052,618 B2 | 5/2006 | Moll et al. |
| 7,052,854 B2 | 5/2006 | Melker et al. |
| 7,056,455 B2 | 6/2006 | Matyjaszewski et al. |
| 7,056,758 B2 | 6/2006 | Segal et al. |
| 7,056,849 B2 | 6/2006 | Wan et al. |
| 7,060,241 B2 | 6/2006 | Glatkowski et al. |
| 7,061,010 B2 | 6/2006 | Minakata et al. |
| 7,061,749 B2 | 6/2006 | Liu et al. |
| 7,063,377 B2 | 6/2006 | Brei et al. |
| 7,064,372 B2 | 6/2006 | Duan et al. |
| 7,065,857 B2 | 6/2006 | Watanabe et al. |
| 7,067,096 B2 | 6/2006 | Iijima et al. |
| 7,067,577 B2 | 6/2006 | Aramak et al. |
| 7,070,705 B2 | 7/2006 | Harvey et al. |
| 7,071,259 B2 | 7/2006 | Botros et al. |
| 7,071,406 B2 | 7/2006 | Smalley et al. |
| 7,074,310 B2 | 7/2006 | Smalley et al. |
| 7,074,519 B2 | 7/2006 | Kuhr et al. |
| 7,074,887 B2 | 7/2006 | Wang et al. |
| 7,075,105 B2 | 7/2006 | Kano et al. |
| 7,077,891 B2 | 7/2006 | Jaffe et al. |
| 7,077,939 B1 | 7/2006 | Crooks et al. |
| 7,081,210 B2 | 7/2006 | Hirai et al. |
| 7,082,683 B2 | 8/2006 | Han et al. |
| 7,083,885 B2 | 8/2006 | Aylward et al. |
| 7,086,939 B2 | 8/2006 | Wilkinson et al. |
| 7,091,412 B2 | 8/2006 | Wang et al. |
| 7,094,285 B2 | 8/2006 | Mazany et al. |
| 7,094,386 B2 | 8/2006 | Resasco et al. |
| 7,095,603 B2 | 8/2006 | Mahony et al. |

| | | |
|---|---|---|
| 7,097,820 B2 | 8/2006 | Colbert et al. |
| 7,098,056 B2 | 8/2006 | Demers |
| 7,105,228 B2 | 9/2006 | Averdung et al. |
| 7,108,841 B2 | 9/2006 | Smalley et al. |
| 7,109,136 B2 | 9/2006 | Seneca et al. |
| 7,115,305 B2 | 10/2006 | Bronikowski et al. |
| 7,115,864 B2 | 10/2006 | Colbert et al. |
| 7,118,652 B2 | 10/2006 | McKnight et al. |
| 7,118,693 B2 | 10/2006 | Glatkowski et al. |
| 7,119,028 B1 | 10/2006 | Roberts et al. |
| 7,122,106 B2 | 10/2006 | Lin et al. |
| 7,122,165 B2 | 10/2006 | Wong et al. |
| 7,122,710 B2 | 10/2006 | Margrave et al. |
| 7,125,101 B2 | 10/2006 | Cruz-Uribe et al. |
| 7,125,533 B2 | 10/2006 | Khabashesku et al. |
| 7,127,294 B1 | 10/2006 | Wang et al. |
| 7,129,133 B1 | 10/2006 | Avanzino et al. |
| 7,129,554 B2 | 10/2006 | Lieber et al. |
| 2004/0142172 A1* | 7/2004 | Sugiyama et al. ............ 428/403 |
| 2004/0198892 A1 | 10/2004 | Busta et al. |
| 2005/0058939 A1 | 3/2005 | Daga et al. |
| 2005/0129858 A1 | 6/2005 | Jin et al. |
| 2005/0218789 A1* | 10/2005 | Seon ............................ 313/497 |
| 2005/0242344 A1 | 11/2005 | Lee et al. |
| 2005/0275330 A1 | 12/2005 | Sung |
| 2006/0216412 A1* | 9/2006 | Chen .............................. 427/78 |

OTHER PUBLICATIONS

Collazo, R. et al.; Two Field-Emission States of Single-Walled Carbon Nanotubes; *Applied Physics Letters* vol. 78, No. 14, Apr. 2, 2001, pp. 2058-2060.

Lee, Sora et al.; Low Temperature Burnable Carbon Nanotube Paste Component for Carbon Nanotube Field Emitter Backlight Unit; *JVST B—Microelectronics and Nanometer Structures*, J. Vac. Sci. Technol. B 23(2), Mar./Apr. 2005; pp. 745-748.

Nishimura, Kunihiko et al.; Fabrication of Carbon-Nanotube Field-Emitter Array Using Polymer Insulator; *JVST B—Microelectronics and Nanometer Structures*, J. Vac. Sci. Technol. B 22(3), May/Jun. 2004; pp. 1377-1381.

Park, Jae-Hong et al.; Synthesis and Properties of Carbon Nanotube Paste with Different Inorganic Binders for Field Emission Display; *Asia Display / IMID '04 Digest* P-15; pp. 468-470.

Romero, J. D. et al.; Outgassing Behavior of Spin-On-Glass (SOG); *Journal of Materials Research* vol. 6, No. 9, p. 1996, May 2, 1991.

International Search Report mailed Nov. 9, 2007, for PCT/US06/62396.

* cited by examiner

CURING BINDER MATERIAL FOR CARBON NANOTUBE ELECTRON EMISSION CATHODES

This application claims priority to U.S. Provisional Application Ser. No. 60/755,978.

TECHNICAL FIELD

The present invention relates in general to field emission devices, and more particularly, to the use of carbon nanotubes for field emission.

BACKGROUND INFORMATION

Carbon nanotubes (CNTs) are the promising candidate as cold cathode materials for field emission displays (FEDs). A CNT FED can be fabricated with low-cost printing techniques, which will be very competitive to current types of flat panel displays, such as liquid crystal displays (LCDs) and plasma display panels (PDPs). Cathode uniformity is a critical factor for commercializing CNT FEDs. The main issues related to field emission uniformity are the uniform dispersion of CNTs, physical size uniformity of CNT pixels, and activation uniformity of the cathodes because most of the printed CNT cathode is required to be activated with various methods including adhesive tape, roller, sand blasting, etc. The activation process can raise the CNTs upward or free the CNTs from binder materials to make them stand upward in response to an applied electrical field.

On the other hand, for CNT cathodes deposited in tens of micrometers deep cavities for triode structures, the current activation processes will not have the same uniform activation effect as on CNT cathodes on a flat surface. To have uniform activation, the uniform pressure and physically uniform contact to the surface of CNT cathodes from the activation materials are very important to obtain uniform field emission cathodes. But due to the deep cavities of triode structures, the activation materials may not uniformly touch the surfaces of the CNT cathodes with the same pressure, resulting in non-uniformity of field emission.

SUMMARY OF THE INVENTION

A new binder material, inorganic polymer, is used to formulate carbon nanotube pastes. This material can be cured at 200° C. and has a thermal-stability up to 500° C. Low outgassing of this binder material makes it a good candidate for long life field emission devices. Due to better adhesion with this binder material, a strong adhesive peelable polymer from liquid form can be applied to the CNT cathode to achieve a uniform activation with even contact and pressure on the surface. The peelable polymer films may be used both as an activation layer and a mask layer to fabricate high-resolution patterned carbon nanotubes cathodes for field emission devices using lithographic processes.

The foregoing has outlined rather broadly the features and technical advantages of the present invention in order that the detailed description of the invention that follows may better be understood. Additional features and advantages of the invention will be described hereinafter which form the subject of the claims of the invention.

BRIEF DESCRIPTION OF THE DRAWINGS

For a more complete understanding of the present invention, the advantages thereof, reference is now made to the following descriptions taken in conjunction with the accompanying drawings, in which.

DETAILED DESCRIPTION

In the following description, numerous specific details are set forth such as specific cathode materials, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

A liquid form of polymer material is proposed (U.S. Patent Pub. No 2005/0129858A1, on Jun. 16, 2005) to fill the cavity structures and activate the CNT cathodes when the cured polymer film is peeled off from the surface of the cathodes. The liquid solution easily penetrates into the porous CNT cathodes so that most of the cathode materials will easily be removed if the adhesion of the CNT is not sufficient, such as the samples prepared by spray and screen printing with CNT pastes. Due to the high adhesion of polymers, inorganic powders may be used to adjust the adhesive property of the polymer to avoid damaging the CNT cathode when peeling off the polymer material. However, to uniformly disperse inorganic powder into the polymer is not easy because the powders tend to sink to the bottom of the polymer and not suspend uniformly in solution. The non-uniform dispersion of powder will therefore lead to non-uniform adhesion properties of the polymer film when it is cured. This will affect emission uniformity of a CNT cathode activated by the powder containing polymer film. But, if the adhesion of the CNT cathode can be improved, the pure polymer solution may be used for uniform activation without removing too much CNT cathode materials or damaging the CNT cathodes.

The CNT paste normally contains organic binders, solvent, and other additives. Glass frit powder is commonly used as an inorganic binder to make CNTs stick to the substrate when the firing process melts the frit materials to bond to the substrate. Unfortunately, glass frit matrix, basically the metal oxide powders (PbO, SiO$_2$, and B$_2$O$_3$, etc.), are not strongly bonded with CNTs on substrate due to non-compatibility of CNTs with frit material and discontinuous coverage of frit material on the substrate after firing. The discontinuous coverage of frit material on a substrate also creates a CNT adhesion-uniformity issue because the non-uniform adhesion over a large-area substrate will lead to non-uniform removal of CNT materials when an activation process is applied. To improve the adhesion of the CNT cathode, a material having both relatively strong bond strength to CNTs and to substrates is needed for the formulation of CNT paste. Spin-on glass binder (SOG) has been reported to formulate CNT paste with other organic vehicle to improve field emission properties (Jae-Hong Park, et al. *Asian Display*/IMID '04 Digest, 468, 2004). But, studies showed SOG materials have an out-gassing problem even after cured, making them not good candidates for vacuum devices (J. D. Romero, M. Khan, H. Fatemi, and J. Turlo, J. Mater. Res., 6 (9), 1996 (1991)). Another issue for CNT pastes is that a high-temperature firing process is commonly used to burn out the organic materials in paste. The firing process normally will deteriorate the field emission properties of CNTs resulting from damaging CNTs and also producing residue from organic vehicle materials in the paste that affect the work function of the CNTs (R. Collazo, R. Schlesser, and Z. Sitar, Appl. Phys. Lett. 78, 2058 (2001)). Low temperature burnable organic binder has been investigated to decrease the firing temperature of CNT cathodes at 360° C. (Sora Lee, Won Bin Im, Jong Hyuk Kang, and Duk Young Jeon, J. Vac. Sci. Technol. B 23(2), 745 (2005)). But glass frit material is still needed to enhance the adhesion of CNT cathodes. The residual materials from organic binder with a low concentration, unfortunately, still can be detected after firing. The residue from organic materials will also cause an out-gassing issue when the field emission devices are vacuum sealed. Organosiloxane polymer, which is used as a low-temperature curing binder material in a U.S. Patent Publication No. US2005/0242344, however, needs to be burned out over 400° C. and also will produce residue materials. A new binder material, which can be cured at low temperature without deteriorating CNTs, is needed for CNT paste formulation. The bind material should also have high-temperature thermal stability, low vacuum out-gassing, and good dispersion with CNTs.

Figure 1:
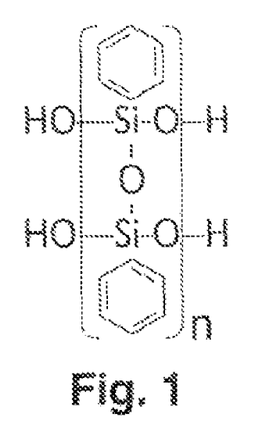
FIG. 1 illustrates a chemical structure of a PPSQ ladder-like inorganic polymer (HO-PPSQ-H)

A silicon ladder-like polymer, polyphenylsilsesquioxane (PPSQ), is an in organic polymer that has a cis-syndiotactic double chain structure, as indicated in FIG. 1 (J. F. Brown, J. Am. Chem. Soc. 82, 6194 (1960). It a been emerging as a next-generation material for semiconductor insulation films, optic fiber bonding, space shuttle outer coating, and moisture-proof coating. This material is being designed with good physical properties of SiO2 an excellent choice of functional group chemical reactivity associated with organic chemistry. Polyphenylsilsesquioxane ((C6H5SiO1.5)x), in particular, has generated a great deal of interest because of its potential replacement for, and compatibility with, currently employed, silicon-based inorganics in the electronics, photonics, and other materials technologies. With a low vacuum out-gassing property, PPSQ materials have been considered as an insulator with good adhesion to a substrate for field emission devices (K. Nishimura, et al. J. Vac. Sci. Tech. B 22(3) 1377 (2004)). The adsorption gas from PPSQ type is remarkably low, contributing to a long life of vacuum sealed devices. The PPSQ cant be spin-on coated or screen printed as a thin and thick film on substrates as a dielectric material with a good adhesion for microelectronics. This type of material also has a low thermal shrinkage. The shrinkage of thermal annealing is less than 0.1%. Moreover PPSQ material can be patterned by wet and dry etching. Unlike glass frit powder, PPSQ material can be dissolved in a solvent to make a solution so that CNTs can be dispersed in the adhesive binder matrix to obtain a uniform adhesion layer on a substrate. This material can be cured at 200° C. and has a thermal-stability up to 500° C. making it a good binder candidate for CNT formulation to replace glass frit material or even organic binder materials. PPSQ-type polymer can be bond-terminated by other functional chemical groups, such as C2H5O-PPSQ-C2H-5 and CH3-PPSQ-CH3.

Polyhedral oligomeric silsesquioxane (POSS), another type of inorganic polymer, may also be used for formulation of CNT paste. POSS chemical technology has unique features: the chemical composition is a hybrid, intermediate (RSiO1.5) between that of silica (SiO2) and silicone (R2SiO).

PPSQ CNT Paste Formulation 1:

PPSQ material may be made by mixing 40~50 wt. % PPSQ material and 40~50 wt. % toluene with a stirring machine for 15 hours. The viscosity of PPSQ may range from 500-5000 CP. Then the PPSQ CNT paste may be formulated as following:

20~30 wt. % PPSQ+60~70 wt. % thinner (tepineol)+3~10 wt. % SWNTs+3~10 wt. % graphite (~15 microns) may be blended in a mortar by hand. Then, a three roll mill may be used to process this mixture 5 times. The graphite powder may be added for creating boundaries so that CNTs will not be fully buried by PPSQ material and ensure some CNTs can be freed by an activation process.

Figure 2:
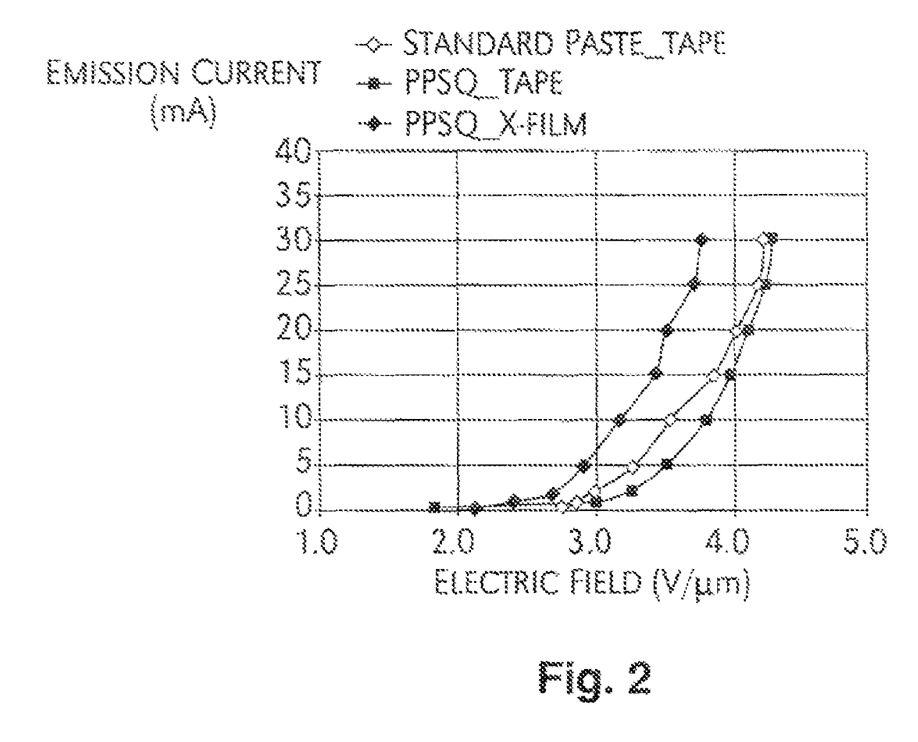
FIG. 2 illustrated a field emission I-V comparison among standard CNT and PPSQ CNT cathodes.

The PPSQ CNT paste may be printed onto ITO glass with a mesh screen. The active CNT cathode area may be 3×3 cm$^2$. The PPSQ CNT cathode is fired with a firing process (400° C. in nitrogen). The CNT cathodes have a very good adhesion because with a foam sheet almost no materials can be removed from the surface of the cathodes. Adhesive tape activation works for PPSQ CNT cathodes with very little materials removed from the surface and the thickness (~7 microns) stays the same before and after activation. When soft foam and adhesive tape are used for activation, a laminator may be employed to apply foam or tape on the surface of CNT cathodes through the rollers with proper pressure. The PPSQ CNT cathodes have much better adhesion on substrate than the other CNT cathodes prepared from pastes containing glass frit and organic material. More than 50% of material will be removed for other carbon nanotube cathode containing glass frit or other binders when adhesion tape activation process is applied. FIG. 2 shows I-V curves from two PPSQ CNT cathodes and a standard CNT cathode. The standard CNT paste includes CNTs, organic vehicle, glass frit, and solvent.

Due to higher adhesion of PPSQ-based CNT cathodes, a water-based polymer (V-film replicate X2020 available from Transfer Devices, Inc.) is able to activate CNT cathodes. The water-based polymer solution includes 56~78 wt. % water, 17~34 wt. % ethyl alcohol, 3~8 wt. % ethanol homopolymer, and 1~2 wt. % butyl alcohol. The activation process is:

1) A drop of the liquid polymer (X film) solution is put on the CNT cathode. The liquid solution is uniformly flooded all over the cathode.
2) Dry the X-film in air or in oven at 60° C. The thickness of the X-film may be controlled over 50 microns by adjusting the volume of the X-film solution.
3) The X-film is peeled off to activate the CNT cathode.

The liquid solution easily penetrates into the porous CNT cathodes so that most of the cathode materials will be removed if the adhesion of CNT is not good enough, such as with samples prepared by spray, and some printed samples.

X-film activation works well for printed PPSQ CNT cathodes that have a good adhesion. The standard CNT cathodes are fired at 450° C. and can be activated by tape or foam, but the X-film removes almost all the CNT cathode materials, resulting in very bad field emission sue to very little CNTs left on the substrate.

Different from the complicated polymer materials used in U.S. Patent Pub. No.: US2005/0129858A1, the X-film is a water-soluble polymer and can be hardened in air at room temperature. The PPSQ CNT paste is also unique because it has much better adhesion than traditional CNT pastes.

Advantages of using X-film activation:
1) Well-structure substrates for triode application can be naturally filled by liquid solution and produce a uniform contact on the surface of CNT cathodes in the wells.
2) The activation using laminator normally creates pressure variation over large cathode, thus leading to uniformity issue. X-film activation may not require employing a laminator.
3) No obvious residue is observed on the cathode after activation because a whole polymer sheet is formed after curing. With tape, the adhesive and plastic base are separated and some adhesive residue may remain on the cathode.

Figure 3:
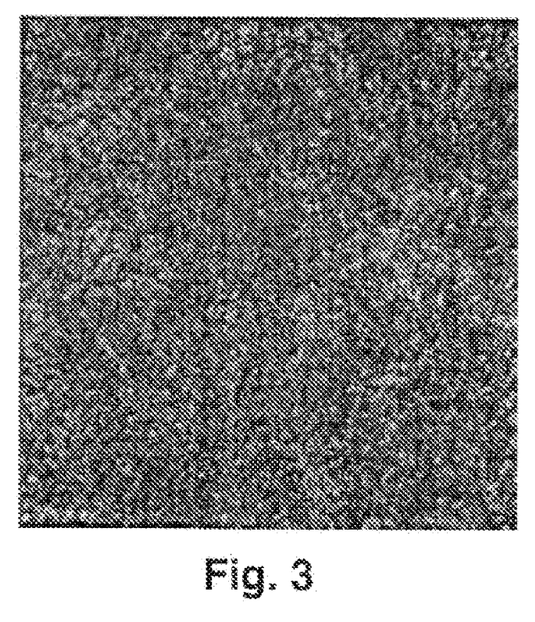
FIG. 3 illustrates a PPSQ CNT cathode activated by tape.
Figure 4:
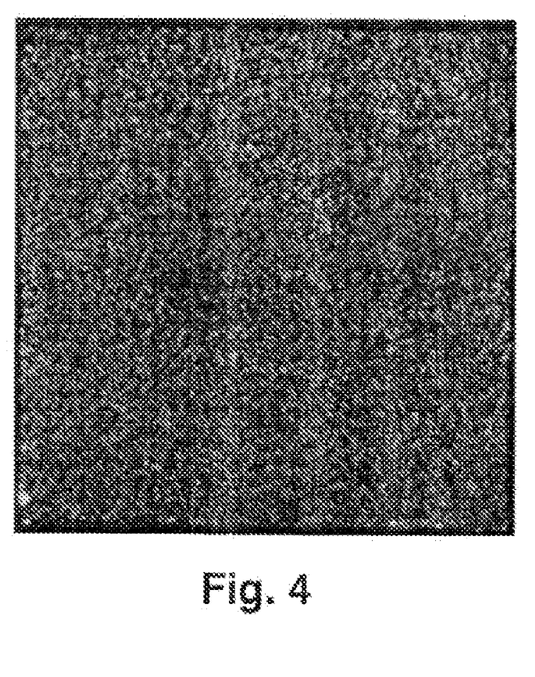
FIG. 4 illustrates a PPSQ CNT cathode activated by X-film.

As FIG. 2 shows, the PPSQ CNT cathode activated by X-film has improved field emission characteristics. FIG. 3 shows field emission illumination from a PPSQ CNT cathode (30 mA at 4.2 V/micron) activated by tape. FIG. 4 shows field emission illumination of a PPSQ CNT cathode (30 mA at 3.9 V/micron) activated by X-film.

PPSQ CNT Paste Formulation 2:

Double-walled CNTs (DWNTs) may also be used to formulate CNT paste. 15~25 wt. % PPSQ (toluene as solvent), 65~80 wt. % thinner, 2~10 wt. % DWNTs, and 2~10 graphite (2~15 microns), may be blended in a mortar by hand. Then, a three-roll mill may be used to process this mixture for at least 5 runs.

Figure 5:
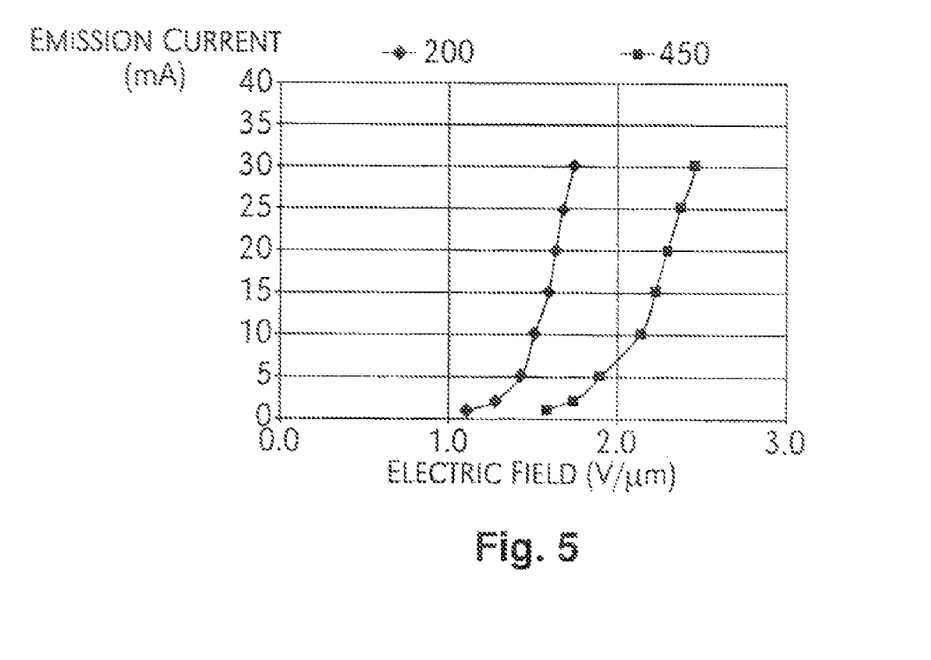
FIG. 5 illustrates a field emission I-V comparison among PPSQ CNT cathodes cured at 200° C. and 450° C.

The PPSQ CNT paste may be printed onto ITO glass with mesh screen (with an active CNT cathode area of 3×3 cm$^2$). The PPSQ CNT cathode may be cured with a baking process (200° C. in air) for 1 hour. The CNT cathodes have a very good adhesion. Tape activation works for the PPSQ CNT cathodes with very little material removed from the surface, and the thickness essentially stays the same before and after activation. FIG. 5 shows the I-V curves from PPSQ CNT cathodes cured at 200° C. and cured at 450° C. It indicated that the lower temperature curing process protects the CNTs from deteriorating, therefore leading to a lower electric field.

PPSQ CNT Paste Formulation 3:

PPSQ also may be added to other CNT pastes to enhance the adhesion. A double-walled CNT (DWNT) paste may be used as a host paste to formulate with 5~15 wt. % PPSQ material. The host DWNT paste may be formulated with 10~20 wt. % CNTs, 30~65 wt. % organic vehicle, 30~60 wt. % thinner, and 5~20 wt. % glass frit powder. The mixture may be blended in a mortar with pestle and then ground by a three roll mill for further dispersion. Thinner (tepineol) may be used to adjust the viscosity of the paste during formulation. The viscosity of the paste may range from 9000 CP to 90,000 centipose (CP).

PPSQ CNT Paste Formulation 4:

10~30 wt. % PPSQ+40~70 wt. % thinner (tepincol)+3~10 wt. % SWNTs+(6~20 wt %) organic vehicle+3~20 wt. % graphite (2~15 microns) are blended in a mortar by hand. Organic vehicle includes ethyl cellulose (15-20%), butyl carbitol acetate (60-70%), and butyl carbitol (10-20%). Then, a three-roll mill may be used to process this mixture for 5 times.

The viscosity of the paste may range from 10000 CP to 90000 centipose (CP). The CNT cathode prepared with this paste formulation may be fired at 390° C. to burn out the organic vehicle materials. The vehicle materials in this formulation are to make the PPSQ-based paste more suitable for printing.

Figure 6A:
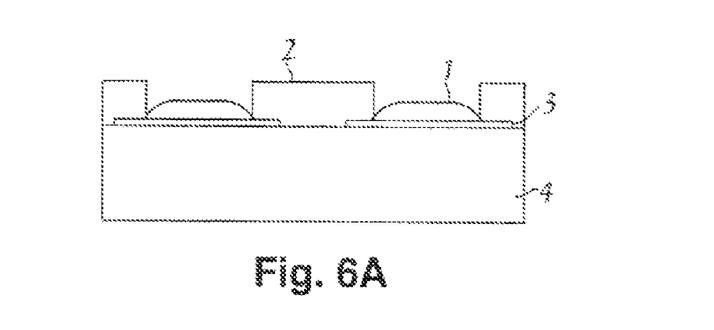
FIGS. 6A and 6B illustrate a liquid polymer (X-film water solution) filled into cavities of triode structures and cured to form a peelable thick film for activation.
Figure 6B:
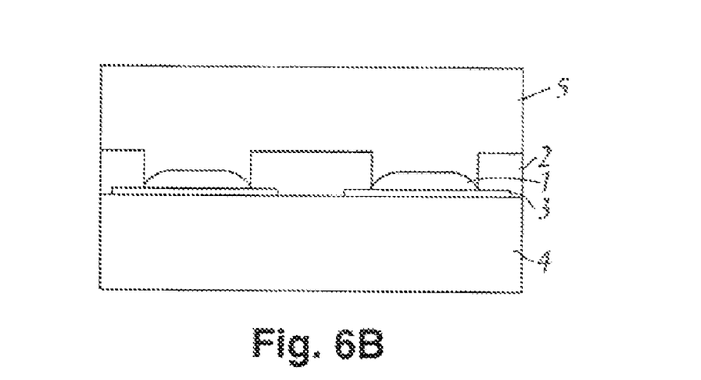

Using a mesh screen, the PPSQ modified CNT paste may be screen-printed onto triode structures with 50 μm deep wells, as shown in FIG. 6. FIG. 6A illustrates a substrate 4 on which electrodes 3 and insulators 2 have been deposited and patterned with a CNT cathode 1 deposited within the wells of the triode structures. FIG. 6B shows a peelable polymer film 5 formed from a liquid material of X-film. The liquid polymer (X-film water solution) is filled into the cavities of the triode structures and is cured to form a peelable thick film (over 50 μm) for activation of the CNT cathodes 1.

Figure 7:
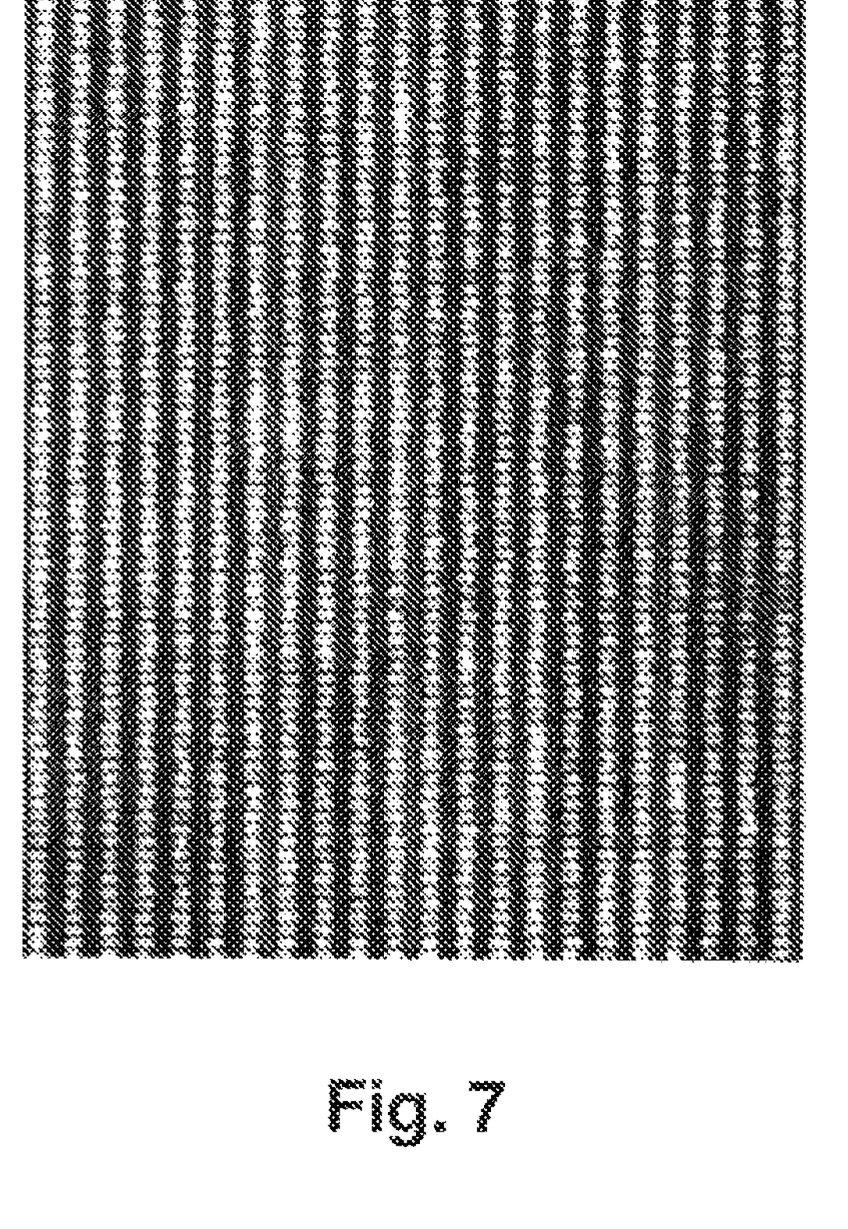
FIG. 7 illustrates a uniform field emission image obtained by using X-film activation on triode structures with 50 μm deep wells.

With X-film activation, very uniform CNT-cathodes with deep cavities can be obtained, as shown in FIG. 7. FIG. 7 shows a digital image of field emission illumination illustrating very uniform field emission obtained by using X-film activation on triode structures with 50 μm deep wells, as illustrated in FIG. 6. In this sample, the pixel size is 250×800 μm$^2$.

Figure 8A:
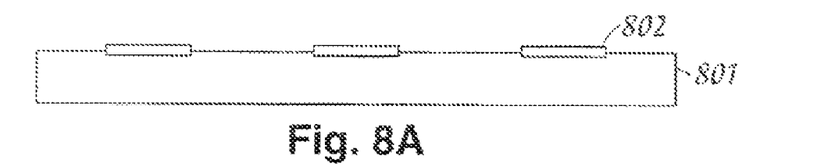
FIGS. 8A-8I illustrate a process using peelable film to pattern and activate a CNT cathode with high-resolution.
Figure 8B:
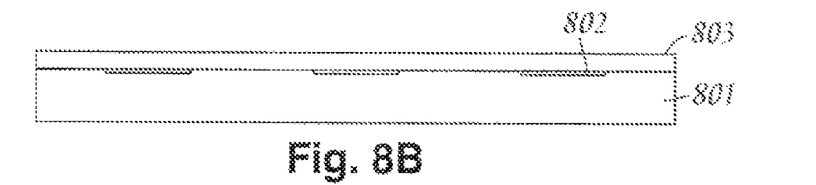
Figure 8C:
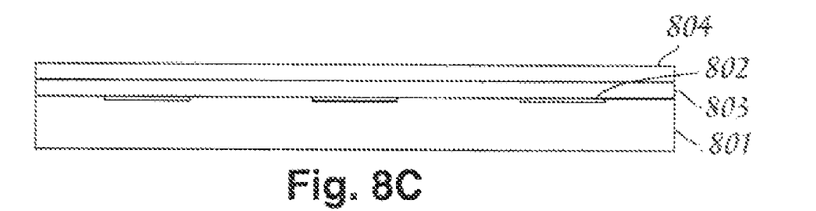
Figure 8D:
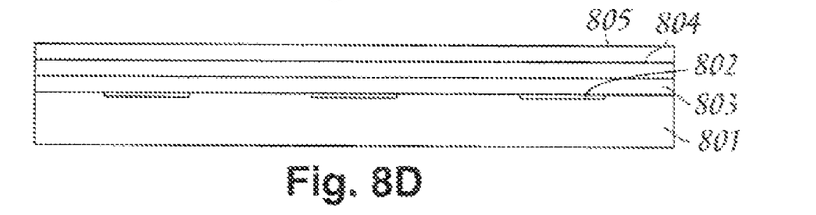
Figure 8E:
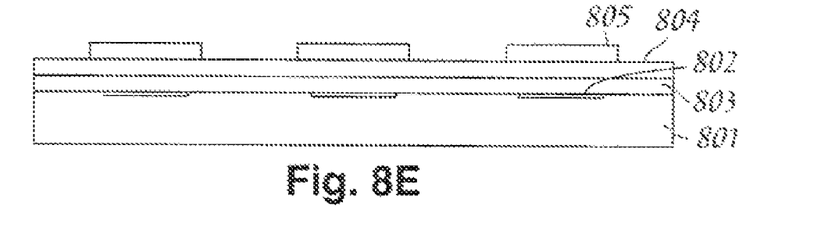
Figure 8F:
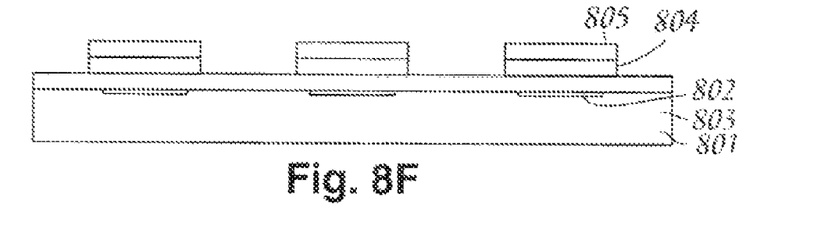
Figure 8G:
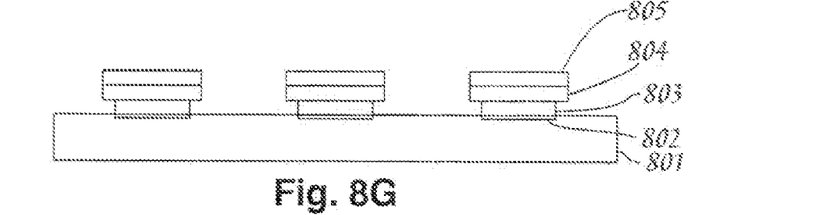
Figure 8H:
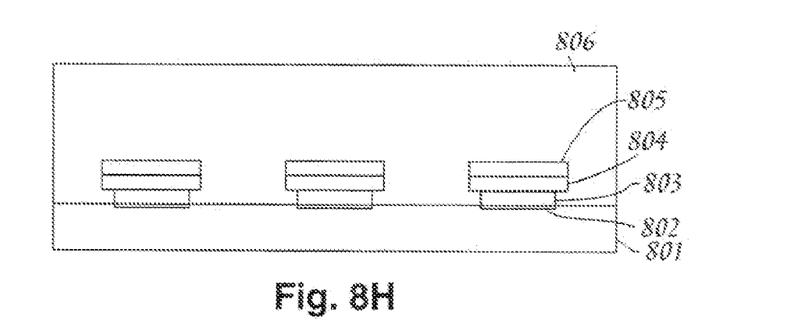
Figure 8I:
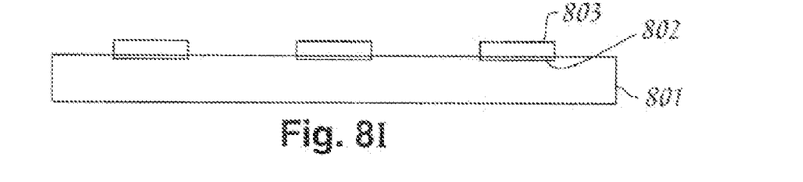

High-Definition Patterned CNT Cathode by Using PPSQ CNT Paste and X-Film:

The resolution limit for screen printing makes it difficult to have a pattern with features smaller than 50 μm. A UV (ultraviolet) sensitive polymer may be used to pattern CNTs. Unfortunately, this polymer material may have a residue after the CNT cathode is patterned. Moreover, a lift-off process is normally required to remove the UV exposed area. Solvent is commonly used in this lift-off process, which affects the CNT cathode. It has been proved that peelable X-film can be patterned by using standard lithographic process. A process is hereby disclosed that using peelable film, CNT cathodes may be patterned with relatively high resolution and also may be activated when the peelable film is removed, as indicated in FIG. 8. PPSQ CNT cathodes may be etched using $CF_4$ and $O_2$ by RIE (reactive ion etching) because PPSQ material can be etched with a relatively high etching rate. In FIG. 8A, electrodes are deposited on a substrate. In FIG. 8B, the process continues with the printing of the PPSQ CNT cathodes. FIG. 8C shows an X-film spin-on coated on top of the cathodes. FIG. 8D illustrates the coating of a photoresist of top of the X-film layer. In FIG. 8E, the process continues with the patterning of the photoresist in a desired manner. In FIG. 8F, the X-film is exposed and removed using typical lithography techniques with photoresist. In FIG. 8G, the exposed PPSQ CNT cathode material is removed by dry etching. In FIG. 8H, a thick X-film is deposited, and the in FIG. 8I, the thick X-film is peeled off to activate the pattern CNT cathodes.

Figure 9:
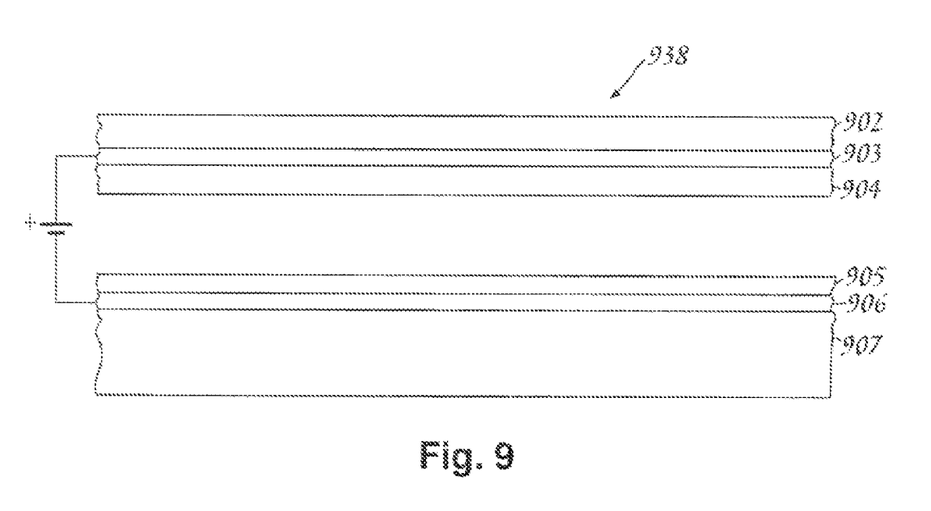
FIG. 9 illustrates a field emission device configured in accordance with embodiments of the present invention.

FIG. 9 illustrates a portion of a field emission display 938 made using a cathode, such as created above. Includes with the cathode is a conductive layer 906. The anode may be comprised of a glass substrate 902, an indium tin layer 903, and a phosphor layer 904. An electrical field is set up between the anode and the cathode. Such a display 938 could be utilized with a data processing system 1013 such as illustrated with FIG. 10.

Figure 10:
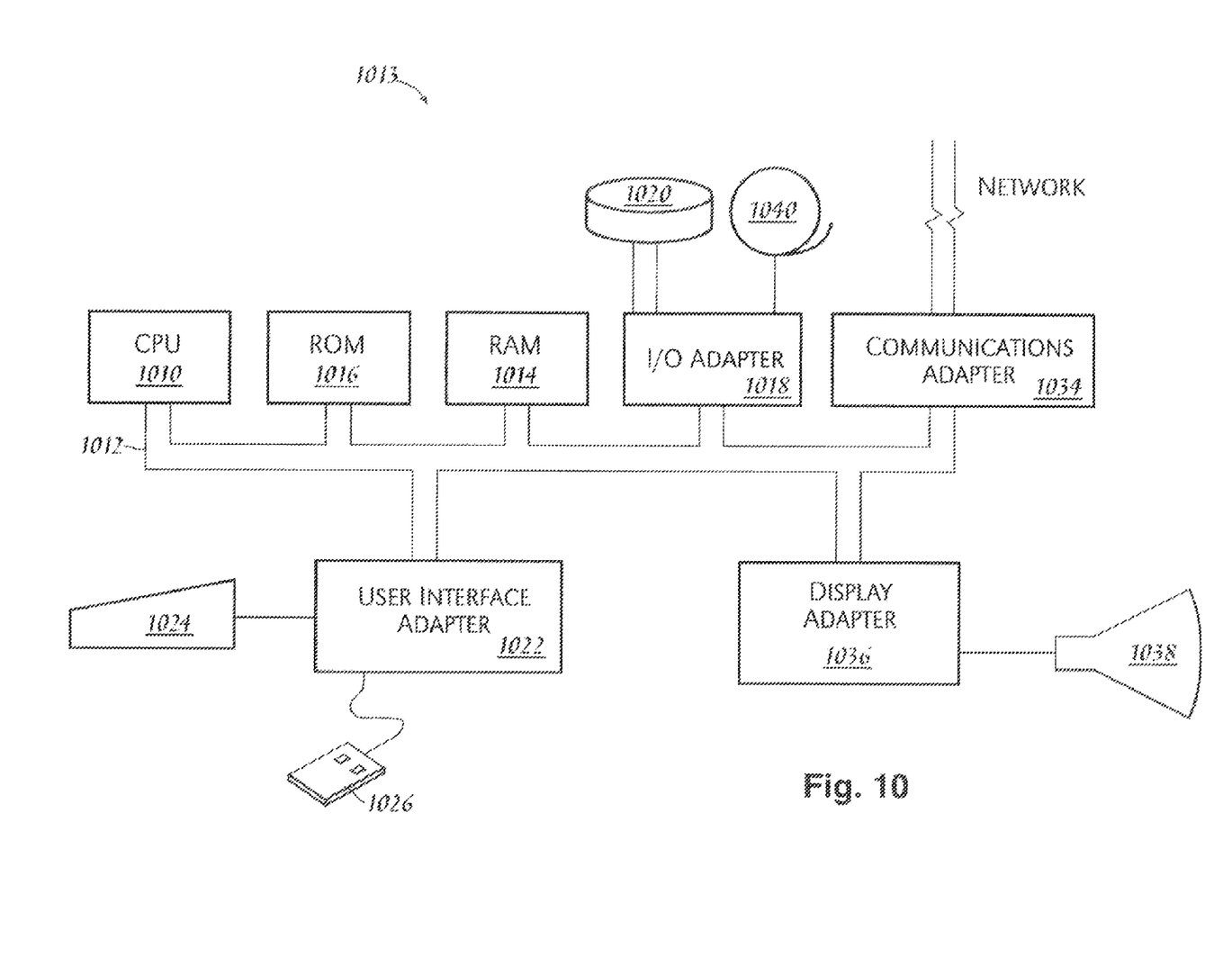
FIG. 10 illustrated a data processing system configured in accordance with embodiments of the present invention.

A representative hardware environment for practicing the present invention is depicted in FIG. 10, which illustrates an exemplary hardware configuration of data processing system 1013 in accordance with the subject invention having central processing unit (CPU) 1010, such as conventional microprocessor, and a number of other units interconnected via system bus 1012. Data processing system 1013 included random access memory (RAM) 1014, read-only memory (ROM) 1016 and input/output (I/O) adaptor 1018 for connecting peripheral devices such as disk units 1020 and tape drives 1040 to bus 1012, user interface adaptor 1022 for connecting keyboard 1024, mouse 1026 and/or other user interface device such as a touch screen device (not shown) to bus 1012, communication adaptor 1034 for connecting data processing system 1013 to a data processing network, and a display adaptor 1036 for connecting bus 1012 to display device 1038. CPU 1010 may include other circuitry not shown herein, which will include circuitry commonly found within a microprocessor, e.g., execution unit, bus interface unit, arithmetic logic unit, etc.

Although the present invention and its advantages have been described in detail, it should be understood that various changes, substitutions and alterations can be made herein without departing from the spirit and scope of the invention as defined by the appended claims.

The invention claimed is:

1. A composite for a field emission cathode, comprising an inorganic polymer mixed with carbon nanotubes wherein the inorganic polymer is a silicon-containing, ladder-like polymer.

2. The composite of claim 1, wherein the inorganic polymer is polyphenylsilsesquioxane (PPSQ).

3. The composite of claim 1, wherein the inorganic polymer is a polyhedral oligomeric silsesquioxane (POSS).

4. A composite comprising a mixture of carbon nanotubes, graphite powder and an inorganic polymer, wherein the inorganic polymer is a silicon-containing, ladder-like polymer.

5. A field emission cathode comprising:
a substrate;
a field emitter on the substrate wherein the field emitter comprises a paste comprising carbon nanotubes and an inorganic polymer, wherein the inorganic polymer is a silicon-containing, ladder-like polymer; and
circuitry for producing an electric field to cause a field emission of electrons from the field emitter.

6. The field emission cathode of claim 5, wherein the inorganic polymer comprises PPSQ.

7. The field emission cathode of claim 5, wherein the inorganic polymer comprises POSS.

8. The field emission cathode of claim 5, wherein the cathode is configured to be activated by forming a film from a liquid polymer solution over the cathode, followed by peeling the film off the cathode.

9. A field emission cathode comprising:
a substrate;
a field emitter on the substrate wherein the field emitter comprises a paste comprising carbon nanotubes and an inorganic polymer; and
circuitry for producing an electric field to cause a field emission of electrons from the field emitter, wherein the cathode is configured to be activated by forming a film from a liquid polymer solution over the cathode, followed by peeling the film off the cathode, wherein the cathode is configured to have an emission current that increases from about 5 mA at an electric field of about 2.4 (V/ium) to about 30 mA at an electric field of about 3.5 (V/ium).

10. A field emission cathode comprising:
a substrate;
a field emitter on the substrate wherein the field emitter comprises a paste comprising carbon nanotubes and an inorganic powder, the inorganic powder comprises a silicon containing, ladder-like polymer; and circuitry for producing an electric field to cause a field emission of electrons from the field emitter.

11. The field emission cathode of claim 10, wherein the inorganic powder comprises PPSQ.

12. The field emission cathode of claim 10, wherein the inorganic powder comprises POSS.

13. The field emission cathode of claim 10, wherein the field emitter is configured to be activated by forming a film from a liquid polymer solution over the field emitter, followed by peeling the film off the field emitter.

14. A field emission cathode comprising:
a substrate;
a field emitter on the substrate wherein the field emitter comprises a paste comprising carbon nanotubes and an inorganic powder; and
circuitry for producing an electric field to cause a field emission of electrons from the field emitter, wherein the field emission cathode is configured to have an emission current that increases from about 5 mA at an electric field of about 2.4 (V/ium) to about 30 mA at an electric field of about 3.5 (V/ium).

* * * * *